Figure 1:
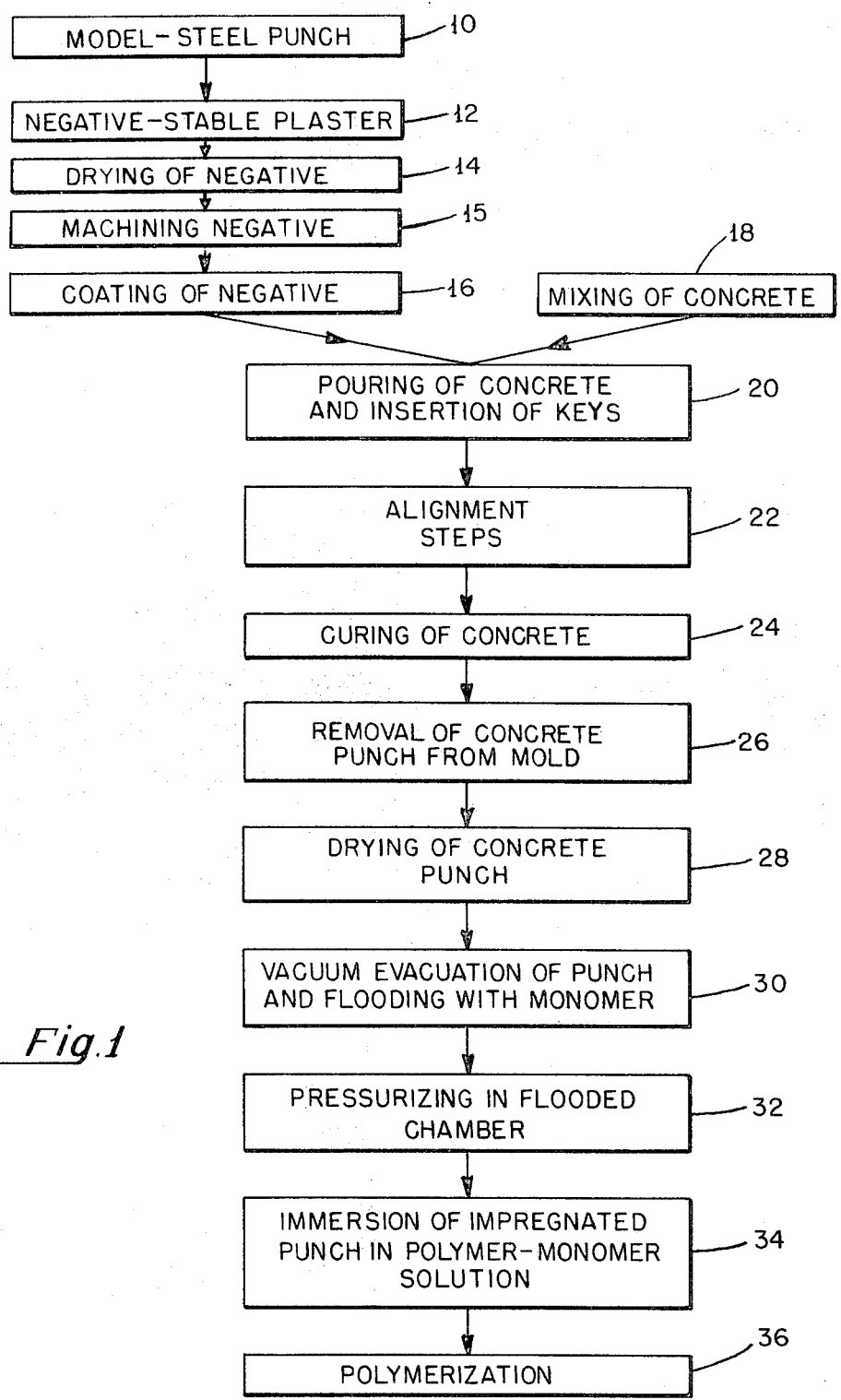

United States Patent [19]
Gutnajer

[11] 3,763,542
[45] Oct. 9, 1973

[54] SHORT RUN PRODUCTION TOOL

[75] Inventor: Ludwik Gutnajer, Carversville, Pa.

[73] Assignee: The Budd Company, Philadelphia, Pa.

[22] Filed: Dec. 18, 1970

[21] Appl. No.: 99,401

[52] U.S. Cl.................. 29/400, 76/107 R, 117/61, 117/119, 264/85, 264/89, 264/93, 264/102, 264/225, 264/259
[51] Int. Cl........................................... B23p 17/00
[58] Field of Search.................... 264/259, 220, 227, 264/271, 256, 101, 129, 102, 225, 226; 25/118 M; 29/400; 249/91, 93; 117/61, 123 D, 119; 76/107 R

[56] References Cited
UNITED STATES PATENTS

| | | | |
|---|---|---|---|
| 2,932,583 | 4/1960 | Grana | 117/61 X |
| 1,965,646 | 7/1934 | Ihrig | 264/101 X |
| 2,732,607 | 1/1956 | Dodd | 25/118 H |
| 3,446,885 | 5/1969 | Krauss | 264/227 |
| 1,887,368 | 11/1932 | Zech | 25/118 H |
| 2,859,530 | 11/1958 | Renaud | 264/256 |

Primary Examiner—Robert F. White
Assistant Examiner—Thomas P. Pavelko
Attorney—Thomas J. Davenport, Edward M. Farrell, John D. Sowell, Alford L. Trueax and William R. Nolte

[57] ABSTRACT

A method of forming a polymer impregnated concrete tool, such as a punch, includes the steps of pouring the concrete in a negative casting. Steps are taken while the concrete is still soft to assure that the tool attachments are properly aligned. The concrete is then cured and monomer is added under pressure. The impregnated tool is then put in a polymer monomer solution and polymerized.

4 Claims, 6 Drawing Figures

INVENTOR.
LUDWIK GUTNAJER
BY Edward M Farrell
ATTORNEY

SHORT RUN PRODUCTION TOOL

Concrete polymer composites for construction have been under investigation for some time. Such developments have included methods of preparation of both preformed and premixed concrete polymer composites. In general, the preparation for preforming concrete consists of drying, evacuating, monomer soaking, coating, and in situ polymerizing the monomer by gamma radiation or by thermal catalytic initiation or by a combination of both.

Such impregnated concrete composites have been suggested for such things as concrete pipes, and various other items. A report entitled "Concrete Polymer Materials," dated December 1968, prepared by the Radiation Division, Nuclear Engineering Department of Brookhaven National Laboratory, Associated Universities, Inc., Upton, New York and the Division of Research, Bureau of Reclamation, Denver, Colorado for the Division of Isotopes Development, United States Atomic Energy Commission, the Bureau of Reclamation, United States Department of the Interior and the Office of Saline Water, United States Department of the Interior, Washington, D.C. describes many of the materials and techniques which may be used in the subject invention. No claim is being made toward any of the particular materials or methods described in the aforementioned publication. The invention, while incorporating many of the techniques described in the above publication, involved additional steps relating to the making of a tool and the tool itself.

In the manufacturing of many metallic parts, such as parts for automobiles, it is often desirable to have a prototype run before embarking upon the final tooling necessary for mass production. Such prototype runs may involve the production of a limited number of parts, in the order of 50 or 100. Despite the fact that only a limited number of parts are to be produced, it is still required that the tooling be accurately designed and not subject to excessive wear or dimensional changes during the short runs. The operation of the prototype tooling will generally influence the design of the final tooling which involves expenses of major proportions. Because such prototype tooling is generally discarded after experimental use or after the initial production of a limited number of parts, it is desirable that the tooling be made relatively inexpensively.

In the past plaster mold metal castings have been used to produce prototype tool. This method has been relatively costly.

Because of the high accuracy involved, it is necessary that the prototype or short run production tool formed by precisely aligned with other parts of the machine with which it is used. For example, if the tool is a forming tool or punch, alignment with the associated driving ram is extremely important.

It is an object of this invention to provide an improved method of building a tool which is capable of maintaining an improved dimensional accuracy over plaster mold metal castings used theretofore.

It is a further object of this invention to provide an improved method for preparing a relatively inexpensive tool capable of being used in low run production.

It is still a further object of this invention to provide an improved method for building a tool wherein changes in design and dimensions of tool may be attained relatively inexpensively.

It is still a further object of this invention to provide a novel tool having relatively low wear, high dimensional stability and low cost.

In accordance with the present invention, a method of forming a polymer impregnated concrete tool in proper alignment with the ram associated with the tool includes the steps of pouring concrete into a negative casting of the part to be formed. The connecting elements of the ram are inserted into the concrete before the concrete hardens. The concrete is then hardened and cured. After being placed in a vacuum evacuated chamber, the concrete is flooded with monomer. After removal from the chamber, the tool is immersed in a polymer solution and polymerized.

Other objects and advantages of the present invention will be apparent and suggest themselves to those skilled in the art, from a reading of the following specification and claims, in connection with the accompanying drawings, in which:

FIG. 1 is a block diagram illustrating the steps to be taken in the method involving the present invention, and FIGS. 2 to 6 illustrate the detailed steps of making a concrete punch to assure proper alignment while the concrete tool assembly is being formed.

Referring particularly to FIG. 1, the steps for producing a polymer impregnated concrete punch is illustrated. The first step involves taking a model of the punch, which may be a steel punch, and making a negative from it. The model is generally sprayed first with a mold release compound. The negative is obtained by providing a flask around the model which may be held together with straps.

A staple plaster is then poured around the model. The staple plaster, which is commercially available, should have a relatively low expansion in the order of 0.0005 inch per inch. The hardened plaster is machined, as illustrated in step 15, to assure initial alignment of the tool to be ultimately formed.

After the model has been removed from the plaster, the plaster may be dried for approximately 10 hours at 250° F. Two coats of sealer and parting compound may then be applied to the plaster negative by brushing or other means.

Next the concrete is mixed, as illustrated in step 18, and then poured into the plaster negative as illustrated by step 20.

Before the concrete is cured or starts to harden, keys connected to a ram element of a machine are then inserted into the concrete. At this time it is important that the alignment of the keys and the associated parts of the machine including the ram be in precise alignment with the concrete punch being formed. Steps are employed to align the keys within the concrete punch by assuring that the ram element of the driving machine is in precise alignment. The steps relating to this alignment are illustrated and will be more definitely described in connection with FIGS. 2 to 6.

Following the steps of alignment, illustrated as step 22, various steps such as described in the aforementioned report may be followed.

The concrete is cured as illustrated in step 24 and then removed from the negative mold, as illustrated in step 26. The concrete may be cured for about 7 days and then dried for approximately twenty four hours at 200° F in a hot air oven. The drying operation is illustrated by step 28.

The concrete tool is then vacuum evacuated in a vacuum chamber for approximately 2 hours. The concrete tool is then flooded with monomers, which for example, could be methylmetacrylate and 1.3 butylenediemetacrylate. The steps of evacuating and flooding is illustrated by step 30.

Following the flooding of the concrete tool with monomers, it is then pressurized for approximately 2 hours in an atmosphere of nitrogen. This is illustrated in step 32.

The concrete tool is then immersed into a polymer monomer solution, as illustrated in step 34. Finally, as illustrated in step 36, the compound within the concrete tool are permitted to polymerize at approximately 167° F for approximately 1.5 hours.

Figure 2:
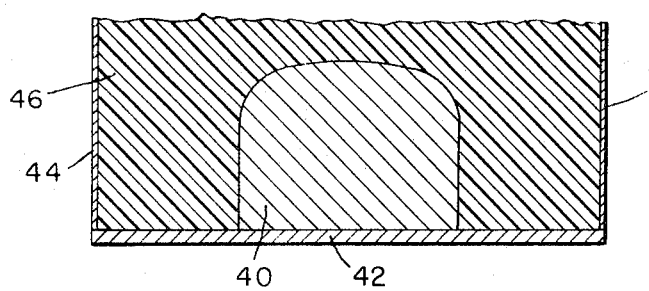

Referring particularly to FIG. 2, the steps 10, 12 and 14 of FIG. 1 are illustrated. A model 40 is first placed on a bottom plate 42. A flask 44 which may be held together with straps is provided around the model 40.

Staple plaster 46 is poured around the model. When it is poured and allowed to harden, the top surface of the plaster 46 is highly irregular.

Figure 3:
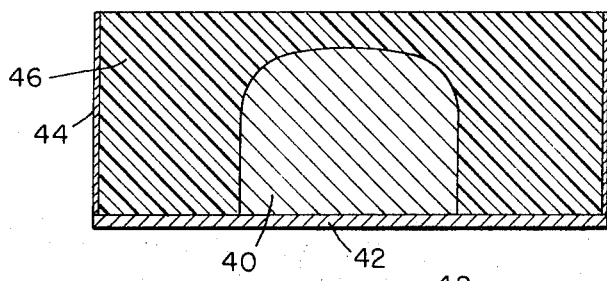

As illustrated in FIG. 3, the top surface of the plaster 46 is machined even so that its top surface is parallel with the flat bottom plate 42. This is an important preliminary step in the ultimate alignment of the tool to be formed with an associated ram. This step 15 is illustrated in FIG. 1.

Figure 4:
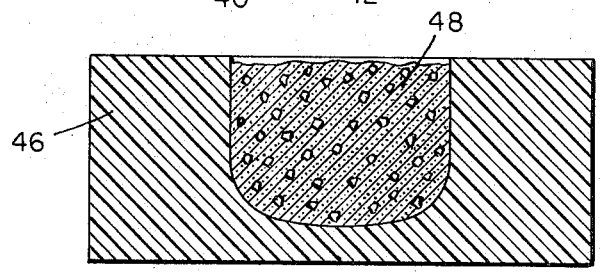
Figure 5:
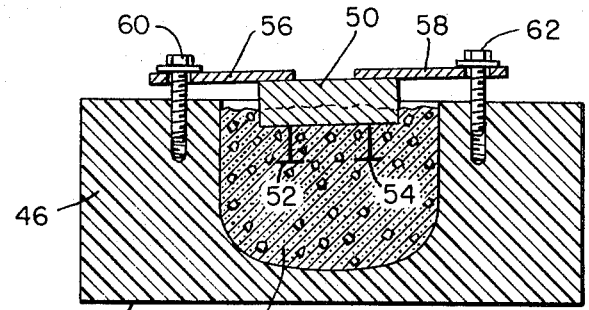
Figure 6:
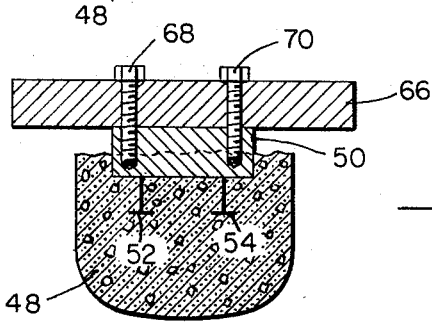

The model is then removed from the hardened plaster and inverted as illustrated in FIG. 4. The negative plaster may be coated with coats of sealer and parting compounds. Concrete 48 is then poured into the plaster negative 46. The alignment steps, illustrated as step 22 in FIG. 1, are then followed. These steps are illustrated in FIG. 5.

While the concrete is soft, a plate 50 including a plurality of keys 52 and 54 attached thereto is inserted into the concrete. The plate 50 is connected to a pair of members 56 and 58 by any suitable means, such as screws (not illustrated) which may be removed after the initial alignment. The members 56 and 58 include the pair of movable adjustment screws 60 and 62, respectively.

The plate 50 is ultimately connected to a ram and it is important that this plate be parallel with the bottom portion of the plaster body 46, which has already been previously aligned. The screws 60 and 62 are adjusted until the surface of the plate 50 is parallel with the bottom portion 64 of the plaster 46.

The concrete is then permitted to harden. Following the hardening of the concrete, the various steps 24, 26, 28, 30, 32, 34 and 36 illustrated in FIG. 1 are then followed.

After the concrete punch has been polymerized as illustrated in 36, it has a low friction surface. After the adjustment elements including the members 56 and 58 have been removed from the plate 50, the plate 50 is mounted to a structure 66 which is connected to a main driving ram. A pair of screws 68 and 70 may extend through the member 66 into threaded engagement with the plate 50.

In practicing the present invention, it was found that the concrete punch made in accordance with the aforementioned method is highly accurate and ideally suited for prototype tooling. The punch formed maintained its dimensional characteristics and did not chip or break during the prototype runs which involved forming of metal parts in the amounts of several hundred pieces. The low friction surface of the punch contributed greatly to the non-wear characteristics obtained by the punch.

While the subject invention has been described in connection with a punch, the methods described are equally applicable to making female blank holders to be used with the punch.

What is claimed is:

1. A method of forming a polymer impregnated concrete tool comprising the steps of providing a flat bottom plate and a model upon said plate, forming a negative casting from said model, machining on the top surface of said negative casting a planar reference surface parallel with the flat bottom plate, pouring concrete into said negative casting, providing a plate member having a planar surface and attachment elements for attachment to a ram member, inserting said plate member into said concrete while said concrete is in a soft state, aligning said plate member parallel with said planar surface of said negative casting, curing said concrete and removing it from said casting, drying said concrete, vacuum evacuating said concrete, flooding said concrete with monomer, pressurizing said concrete, and polymerizing said monomer.

2. A method as set forth in claim 1 wherein additional steps are provided for making said negative casting, said additional steps including providing holding means, inserting a model into said holding means, pouring plaster into said holding means around said model, allowing said plaster to harden, leveling the exposed surface of said plaster, removing said model to provide said negative casting of said tool to be formed.

3. A method as set forth in claim 2 wherein the additional steps are provided of inverting the negative casting prior to pouring said concrete, and using the leveled surface of said plaster as said predetermined reference level for aligning said plate member.

4. A method as set forth in claim 3 wherein an additional step is provided of attaching said plate member with said concrete to a ram of a machine.

* * * * *